US012641582B2

(12) United States Patent
Zhou et al.

(10) Patent No.: US 12,641,582 B2
(45) Date of Patent: May 26, 2026

(54) METHOD AND APPARATUS FOR CARRIER-PHASE POSITIONING WITH MULTIPLE FREQUENCIES

(71) Applicant: Samsung Electronics Co., Ltd., Gyeonggi-do (KR)

(72) Inventors: Yuhan Zhou, San Diego, CA (US); Philippe Jean Marc Michel Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 559 days.

(21) Appl. No.: 18/098,348

(22) Filed: Jan. 18, 2023

(65) Prior Publication Data

US 2023/0284192 A1 Sep. 7, 2023

Related U.S. Application Data

(60) Provisional application No. 63/397,056, filed on Aug. 11, 2022, provisional application No. 63/394,158, (Continued)

(51) Int. Cl.
| | |
|---|---|
| *H04W 72/0453* | (2023.01) |
| *H04L 5/00* | (2006.01) |
| *H04W 48/20* | (2009.01) |
| *H04W 56/00* | (2009.01) |
| *H04W 64/00* | (2009.01) |

(52) U.S. Cl.
CPC ....... *H04W 72/0453* (2013.01); *H04L 5/0048* (2013.01); *H04W 48/20* (2013.01); *H04W 56/0035* (2013.01); *H04W 64/003* (2013.01)

(58) Field of Classification Search
CPC ......... H04W 72/0453; H04W 72/0473; H04W 72/0466; H04W 72/046; H04W 72/044; H04W 48/20; H04W 48/18; H04W 48/16; H04W 48/02; H04W 56/0035; H04W 56/0005; H04W 56/0001; H04W 56/003; H04W 64/003; H04W 64/00; H04W 64/006; H04L 5/0048; H04L 5/005; H04L 5/0051; H04L 5/0058; H04L 5/0078; H04L 5/0053; H04L 5/0091
See application file for complete search history.

(56) References Cited

U.S. PATENT DOCUMENTS

| | | | |
|---|---|---|---|
| 7,633,437 | B2 | 12/2009 | Hatch |
| 7,728,767 | B2 | 6/2010 | Euler |

(Continued)

FOREIGN PATENT DOCUMENTS

| | | | | | |
|---|---|---|---|---|---|
| CN | 111082907 | A | * | 4/2020 | ........... G01S 5/0036 |
| CN | 113840227 | A | * | 12/2021 | ........... G01S 5/0036 |

(Continued)

*Primary Examiner* — Phong La
(74) *Attorney, Agent, or Firm* — The Farrell Law Firm, P.C.

(57) ABSTRACT

A system and a method are provided in which a user equipment (UE) obtains a set of coefficients and a set of subcarriers from a location management function (LMF), and measures carrier phases on subcarriers, from the set of subcarriers, of a received reference signal transmitted with multi-carrier modulation. The UE determines a virtual carrier phase generated from the measured carrier phases and corresponding coefficients, from the set of coefficients. The UE reports the virtual carrier phase to the LMF.

20 Claims, 5 Drawing Sheets

Related U.S. Application Data filed on Aug. 1, 2022, provisional application No. 63/313,100, filed on Feb. 23, 2022, provisional application No. 63/307,848, filed on Feb. 8, 2022.

(56) References Cited

U.S. PATENT DOCUMENTS

| | | |
|---|---|---|
| 9,110,147 B1 | 8/2015 | Mason et al. |
| 10,748,967 B2 | 8/2020 | Liang et al. |
| 10,890,665 B2 | 1/2021 | Modarres Razavi et al. |
| 2022/0078745 A1* | 3/2022 | Siomina ............... H04B 7/0645 |
| 2022/0248375 A1* | 8/2022 | Baek ................. H04W 72/0446 |
| 2023/0074122 A1* | 3/2023 | Kim ...................... G01S 13/282 |

FOREIGN PATENT DOCUMENTS

| | | | | |
|---|---|---|---|---|
| WO | WO-2021081811 A1* | 5/2021 | ............... | G01S 1/08 |
| WO | WO-2021227821 A1* | 11/2021 | ........... | G01S 5/0036 |
| WO | WO-2022134621 A1* | 6/2022 | ......... | H04L 27/0014 |

* cited by examiner

202 — Receive measurement configuration parameters

204 — Measure the carrier phase on the subcarriers

206 — Determine a virtual carrier phase

208 — Report the virtual carrier phase

302 — Receive phase measurement parameters

304 — Determine subcarriers

306 — Measure carrier phase on selected subcarriers

308 — Determine and report virtual carrier phase

402 — Obtain CIR in the time domain

404 — Detect first arrival path and delay spread

406 — Re-sample the CIR in the time domain

408 — Perform FFT on the re-sampled CIR

410 — Obtain a phase measurement on the channel frequency response

412 — Report the phase measurements to the LMF

METHOD AND APPARATUS FOR CARRIER-PHASE POSITIONING WITH MULTIPLE FREQUENCIES

CROSS-REFERENCE TO RELATED APPLICATIONS

This application claims the priority benefit under 35 U.S.C. § 119(e) of U.S. Provisional Application Nos. 63/307,848, 63/313,100, 63/394,158, and 63/397,056, filed on Feb. 8, 2022, Feb. 23, 2022, Aug. 1, 2022, and Aug. 11, 2022, respectively, the disclosures of which are incorporated by reference in their entirety as if fully set forth herein.

TECHNICAL FIELD

The disclosure generally relates to new radio (NR) positioning. More particularly, the subject matter disclosed herein relates to improvements to NR positioning using carrier phase measurements.

SUMMARY

Positioning for NR was standardized in $3^{rd}$ Generation Partnership Project (3GPP) Release (Rel)-16/17, and is able to outperform long term evolution (LTE) positioning due its use of larger frequencies. The standardization of positioning in 3GPP Rel-18 may provide improved accuracy based on NR carrier phase measurements.

Carrier phase measurements may improve positioning accuracy by performing phase measurements instead of, for example, time measurements. The carrier phase is a function of the signal propagation time from a transmit (Tx) antenna reference point of a transmitter to a receive (Rx) antenna reference point of a receiver. Carrier phase measurements may be implemented in an analog domain or a digital domain.

Reference signals that are required for carrier phase positioning need not be wideband, thereby reducing overhead. However, the phase measurements may contain an unknown number of multiples of carrier wavelength (i.e., integer ambiguity). Further, the phase measurement accuracy may be impacted when there are random phase shifts (i.e., phase noise) in the phase measurement. The phase noise must be effectively mitigated for highly accurate phase measurements.

To solve these problems other positioning methods (e.g., time difference on arrival (TDOA)) may be relied on to resolve the integer ambiguity. For example, a user equipment (UE) may first determine an approximate location with TDOA, and then refine the position using carrier phase positioning. Alternatively, fixed known locations may also be used to calibrate the location.

One issue with the above approach is that the integer ambiguity can be resolved only if a positioning accuracy of the TDOA is within one wavelength. Specifically, carrier phase measurements cannot be differentiated when there is a $2\pi$ difference between signals. Further, carrier phase positioning must be performed often so that it does not introduce a new integer ambiguity. Finally, the use of fixed known locations is not scalable.

To overcome these issues, the multiple carrier of orthogonal frequency division multiplexing (OFDM) may be used to improve accuracy and usability of carrier phase measurements. The carrier phase measurement method may be implemented with OFDM signals and the phase may be measured in the frequency domain and/or time domain. For positioning with high accuracy, a line-of-sight (LOS) path component may be taken into account for carrier phase measurement, and non-line-of-sight (NLOS) path components may be mitigated as much as possible.

The above approaches improve on previous methods because they improve performance of carrier phase measurement for NR positioning with OFDM signals and multipath mitigation.

In an embodiment, a method is provided in which a UE obtains a set of coefficients and a set of subcarriers from a location management function (LMF), and measures carrier phases on subcarriers, from the set of subcarriers, of a received reference signal transmitted with multi-carrier modulation. The UE determines a virtual carrier phase generated from the measured carrier phases and corresponding coefficients, from the set of coefficients. The UE reports the virtual carrier phase to the LMF.

In an embodiment, a UE includes a processor and a non-transitory computer readable storage medium storing instructions. When executed, the instructions cause the processor to obtain a set of coefficients and a set of subcarriers from the LMF, and measure carrier phases on subcarriers, from the set of subcarriers, of a received reference signal transmitted with multi-carrier modulation. The instructions also cause the processor to determine a virtual carrier phase generated from the measured carrier phases and the corresponding coefficients, and report the virtual carrier phase to the LMF.

In an embodiment, a system includes a UE configured to obtain a set of coefficients and a set of subcarriers, measure carrier phases on subcarriers, from the set of subcarriers, of a received reference signal transmitted with multi-carrier modulation, determine a virtual carrier phase generated from the measured carrier phases and the corresponding coefficients, and report the virtual carrier phase. The system also includes a location management function configured to transmit the set of coefficients and the set of subcarriers to the UE, and receive the virtual carrier phase from the UE.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
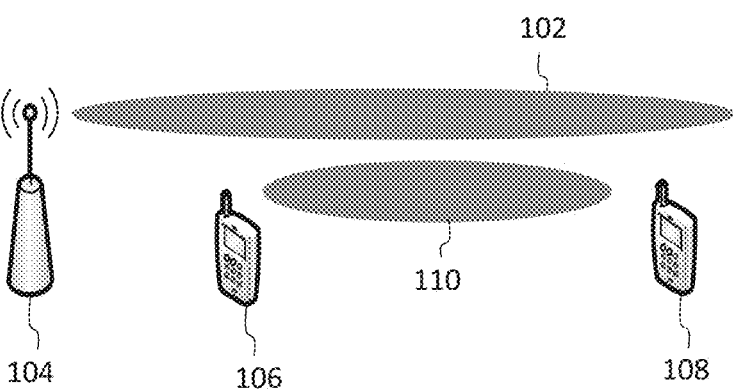
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station or a gNode B (gNB) 104, a first UE 106, and a second UE 108. A data path 110 may enable the transmission of data (and some control information) on a sidelink between the first UE 106 and the second UE 108. The control path 102 and the data path 110 may be on the same frequency or may be on different frequencies.

An NR carrier phase measurement between a transmitter i and a receiver α is set forth below in Equation (1).

$$\lambda(\phi(t) + N) = d(t) + c\big(\delta t^i(i) - \delta t_a(t)\big) + \lambda\big(\varphi^i(t_0) - \varphi_a(t_0)\big) + w^a_{i,\varphi}(t) \quad (1)$$

In Equation (1), $\phi(t)$ is the carrier phase measurement at time t (cycles), $d(t)$ is the geometric distance between a transmitter antenna of transmitter i and a receiver antenna of receiver α (meters), N is an unknown integer ambiguity, $\delta t^i(t)$, $\delta t_\alpha(t)$ are the clock errors of the transmitter i and the receiver α, respectively, (meters), $\varphi_i(t_0)$ and $\varphi_\alpha(t_0)$ are the phase offsets caused by initial phase offsets of the of the transmitter i and the receiver α at initial time $t_0$, respectively, (meters), c is the speed of light (meters/second), λ is the wavelength of the carrier frequency (meters), and $$w^a_{i,\varphi}(t)$$

is the carrier phase measurement error, which may include the measurement errors due to multipath, phase noise, etc. (meters).

One of the key issues for carrier phase positioning involves quick and reliable resolving of integer ambiguity in carrier phase measurements. The integer ambiguity can be mitigated with the help of other positioning methods (i.e., radio access technology (RAT)-dependent positioning). For example, a downlink (DL)-TDOA method may be used to determine a rough position of a target UE. In 3GPP Rel-17 positioning, the horizontal position accuracy for a timing-based method is within 1 meter (m). To resolve the integer ambiguity and achieve higher accuracy (e.g., centimeter level), multiple carrier frequencies may be used for carrier phase measurement. For example, if two carrier frequencies $f_1$ and $f_2$ are utilized, a virtual wavelength $\hat{\lambda}$ is given by Equation (2) below.

$$\hat{\lambda} = \frac{c}{f_2 - f_1} \tag{2}$$

Integer ambiguity N may be determined $\hat{\lambda}$ is within an accuracy range of the non-carrier phase method (e.g., within 1 m for a DL-TDOA method).

Using one subcarrier, a carrier phase may be determined in the frequency domain as set forth in Equation (3) below.

$$\varphi_k = \tan^{-1}\left(\frac{\operatorname{Im}(H(k))}{\operatorname{Re}(H(k))}\right) \tag{3}$$

It is possible to use the multiple carrier of OFDM in several ways to improve the accuracy and usability of carrier phase positioning.

In a first method, virtual frequency may be used to resolve the integer ambiguity. Since frequency and wavelength are inversely proportional, this approach determines the carrier phase for a lower virtual frequency. If the UE location is roughly known with a given accuracy (e.g., a TDOA trilateration has established the location within 1 m), a low enough virtual frequency may be used to determine a value of the integer ambiguity.

A virtual carrier phase may be calculated when multiple carriers are applied for phase measurement. The carrier phases measured on multiple subcarriers ($f_1, f_2, \ldots, f_K$) are ($\varphi_1, \varphi_2, \ldots, \varphi_K$). The carrier phase measurement value on the i-th subcarrier is given by Equation (4) below.

$$\varphi_i = 2\pi\left(f_i \cdot \frac{d}{c} - N_i\right), i = 1, 2, \ldots, K \tag{4}$$

In Equation (4), d is the distance between the gNB (transmitter) and the UE (receiver), c is the speed of light, and $N_i$ is the corresponding carrier phase integer ambiguity.

The virtual carrier phase measurement may be generated using Equation (5) below.

$$\varphi_v = \sum_{i=1}^{K} k_i \varphi_i = 2\pi\left[\left(\sum_{i=1}^{K} k_i f_i\right) \cdot \frac{d}{c} - N_a\right] \tag{5}$$

In Equation (5), $\varphi_v$ is the virtual carrier phase measurement, $$f_a = \sum_{i=1}^{K} k_i f_i$$

is the corresponding virtual frequency, $k_i$ is the linear combination coefficient and is an integer (either positive or negative), and $$N_a = \sum_{i=1}^{K} k_i N_i$$

is the corresponding carrier phase integer ambiguity.

By lowering the frequency through the choice of coefficients $k_i$, it is possible to choose a virtual frequency where $N_\alpha$ can be determined (assuming that the UE location is known with a known maximum error). Accordingly, an absolute phase may be determined.

While this method may resolve the integer ambiguity, at a larger wavelength, the phase variations due to distance are lower, and thus, the carrier phase measurements may be more difficult to measure.

In a second method, multiple measurements may be combined to improve the measurement accuracy. The combination of multiple phase measurement on different carrier frequencies may improve the measurement accuracy. Specifically, all measurements may be taken, brought to a reference frequency $f_0$, and then averaged. For example, if a carrier phase at $f_k$ is measured to be $\varphi_k$, the equivalent carrier phase at $f_0$ is shown in Equation (6) below.

$$\varphi_k = \frac{f_k}{f_0} \varphi_0 \tag{6}$$

It is assumed that $\varphi_0 = \widehat{\varphi_0} + 2\pi N$, where $\widehat{\varphi_0} \in [-\pi, \pi]$ and N is an integer. The UE first needs to estimate N.

Similarly, on subcarrier j, the UE measures $\widehat{\varphi_j} \in [-\pi, \pi]$, resulting in Equation (7) below.

$$e^{j\varphi_J} = e^{j\frac{f_k}{f_0}\widehat{\varphi_0}} \cdot e^{j2\pi N\frac{f_k}{f_0}} \tag{7}$$

With OFDM signals, $f_k = k\Delta f$, where $\Delta f$ is the subcarrier spacing. This results in Equation (8) or (9) below.

$$e^{j2\pi N\frac{f_k}{f_0}} = e^{j\left(\widehat{\varphi_k} - \frac{f_k}{f_0}\widehat{\varphi_0}\right)} \tag{8}$$

$$e^{j2\pi N\frac{\Delta f}{f_0}} = e^{\left(\frac{j}{k}\right)\left(\widehat{\varphi_k} - \frac{\Delta f}{f_0}\widehat{\varphi_0}\right)} \tag{9}$$

With another positioning method (e.g., TDOA or round trip transmission (RTT) method), a rough location may be determined with a given accuracy. Based on the accuracy, a set A of possible N values may be determined. N may be estimated as the value that minimizes $$\sum_{k=1}^{L} \frac{1}{K}\left(\widehat{\varphi_k} - \frac{\Delta f}{f_0}\widehat{\varphi_0}\right)^2.$$

An increase in the integer ambiguity between subcarriers may be resolved as long as the subcarriers are close enough.

When frequency increases, the phase increases. Accordingly, if the integer ambiguity increases by 1, the UE would see a decrease in phase, and it may be determined that a $2\pi$ cycle is added.

Once N is determined, $\varphi_0$ may be determined. The UE may perform the same procedure to other subcarriers to obtain absolute carrier phases, bring them to a reference frequency $f_0$, and average them. Accordingly, if a carrier phase at $f_k$ is measured to be $\varphi_k$, the equivalent carrier phase at $f_0$ is shown in Equation (10) below.

$$\varphi_0 = \frac{f_0}{f_k}\varphi_k \qquad (10)$$

Instead of having a single carrier phase at $f_0$, the UE now has as many as one per subcarrier, which may then be used to de-noise the estimation, such as, for example, through averaging, as shown in Equation (11) below.

$$\varphi_{est} = \frac{1}{N}\sum_{k=1}^{N}\frac{f_0}{f_k}\varphi_k = \frac{1}{N}\sum_{k=1}^{N}\frac{f_0}{k\Delta f}\varphi_k \qquad (11)$$

Equation (11) for this second method is the same as Equation (5) for the first method described above, but with $k_i$ being $$\frac{f_0}{Nf_k}.$$

The second method has a different range of applicability than the first method. For example, the second method may be used to de-noise the carrier phase evaluation when there is no N ambiguity, or it may be useful to track relative motion.

Accordingly, with OFDM, when using the reference of virtual frequency carriers, it may be possible to improve carrier phase measurement estimation. Parameters are selected according to, for example, a current scenario, radio conditions, etc. A protocol allowing a location management function (LMF) to indicate how the UE computes the estimate of carrier phase is described in greater detail below.

Figure 2:
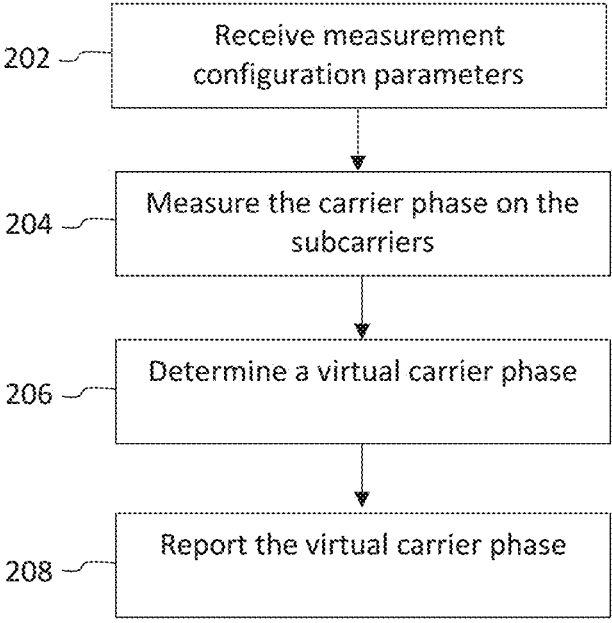
FIG. 2 is a flowchart illustrating a method for carrier phase positioning using a virtual frequency, according to an embodiment.

FIG. 2 is a flowchart illustrating a method for carrier phase positioning using a virtual frequency, according to an embodiment.

At 202, the receiver (e.g., receiving UE) receives measurement configuration parameters. Specifically, the UE receives the parameters from the LMF to measure the carrier phase. The parameters may be received in response to a report of UE capability for measuring virtual carrier phase, provided from the UE to the LMF. The capability report and the parameters may be sent via radio resource control (RRC) signaling. In addition to usual positioning reference signal (PRS) parameters, the configuration parameters may indicate whether the first or second method is to be used, and/or the carrier frequencies $(f_1, f_2, \ldots, f_k)$ for phase measurements as well as the associated coefficients $k_i$.

Resulting overhead may be reduced in several ways. For example, the frequencies $(f_1, f_2, \ldots, f_K)$ may not need to be transmitted, and all subcarriers may be selected by default when the PRS is transmitted. In another example, the coefficients $(k_1, k_2, \ldots, k_K)$ may be further quantified. The multiple groups of coefficients $(k_1, k_2, \ldots, k_K)$ may be defined and uniquely referenced by an index (see Table 1). Only the index of the configuration would be transmitted.

TABLE 1

| Index | Set of subcarriers |
|---|---|
| 1 | $\{k_1^1, k_2^1, \ldots, k_K^1\}$ |
| 2 | $\{k_1^2, k_2^2, \ldots, k_K^2\}$ |
| . . . | |
| I | $\{k_1^i, k_2^i, \ldots, k_K^i\}$ |

In order to cover both the first and second methods, one row/index of Table 1 may be dedicated to cover the averaging formula of Equation (11).

In another embodiment, the LMF may not need to transmit the index. The UE may autonomously determine the k indexes. However, the UE would need to know the virtual frequency, which may be indicated in the configuration message. Alternatively, the virtual frequency may be implicitly known (e.g., center frequency of the carrier, synchronization signal block (SSB), bandwidth part (BWP), lowest subcarrier index, known subcarrier index, etc.).

At 204, the receiver measures the phase on the subcarriers. For each subcarrier i, the UE determines the phase as set forth in Equation (12) below, or using another phase measurement method.

$$\varphi_i = \tan^{-1}\left(\frac{\text{Im}\,[H(j2\pi f_i)]}{\text{Re}\,[H(j2\pi f_i)]}\right) \qquad (12)$$

In Equation (12), $\text{Im}[H(j2\pi f_i)]$ and $\text{Re}[H(j2\pi f_i)]$ are the imaginary part and real part of the channel response at subcarrier $f_i$.

At 206, the receiver determines a virtual phase. The UE determines the phase on the virtual carrier using the determined k coefficients as set forth in Equation (5).

At 208, the receiver reports the virtual phase. Based on the configuration, the UE reports the virtual carrier phase and/or the phase measurements for all of the carriers to the LMF using, for example, RRC signaling.

According to an embodiment, the method of FIG. 2 may be improved by not necessarily using all of the subcarriers. Due the frequency selective nature of the wireless channel, some subcarriers can be in a deep fade. Furthermore, some subcarriers could be affected by higher interference. Using these subcarriers may cause large errors in the carrier phase measurement. To address this issue, only some specific subcarriers (i.e., a subset of all the subcarriers) may be selected by the UE for carrier phase measurement.

In a threshold-based solution for selecting subcarriers, the UE may be configured with a threshold for subcarrier quality. The threshold may be a reference signal received power (RSRP) value, a reference signal received quality (RSRQ) value, or any other quality metric. The UE only uses subcarriers having a measured signal quality that is larger than the threshold. The threshold may be an absolute value, or a relative value (e.g., average RSRQ value over all subcarriers).

In a best-M solution for selecting subcarriers, the UE uses the M best subcarriers in terms of quality (e.g., the top 10%) for the carrier phase determination. The M value may be absolute (e.g., the top 10%), or may depend on signal to interference and noise ratio (SINR) or other values.

Figure 3:
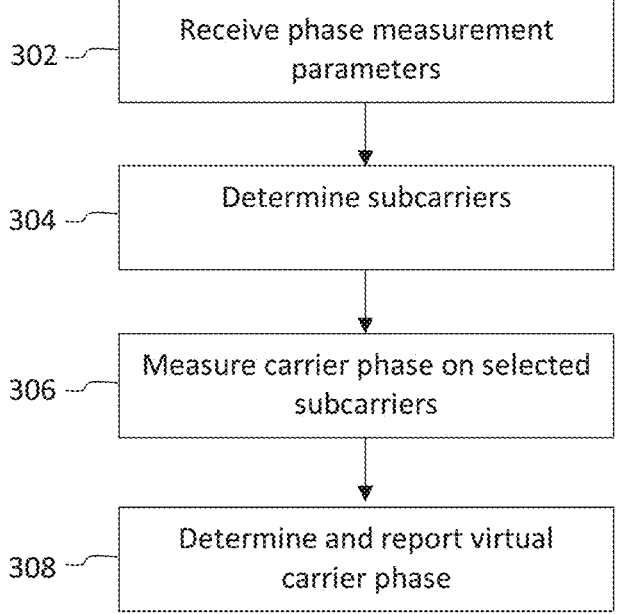
FIG. 3 is a flowchart illustrating a method for carrier phase positioning, according to an embodiment.

FIG. 3 is a flowchart illustrating a method for carrier phase positioning, according to an embodiment.

At 302, the receiver (e.g., receiving UE) receives measurement parameters.

Specifically, the UE receives the parameters to measure the carrier phase, from the LMF. In addition to the usual PRS parameters, the configuration may indicate whether to use the threshold-based method or the best-M method, parameters to select the subcarriers (e.g., a list of subcarriers, thresholds to select subcarriers, M value, etc.), and/or a reference frequency $f_0$ at which to report the carrier phase measurement. These parameters may be sent via RRC signaling. Some/all parameters may be implicit. For example, $f_0$ may be, for example, the carrier center frequency, the center carrier of the SSB, or the lowest subcarrier of the carrier.

At 304, the receiver determines which subcarriers to use. The UE receives the PRS, which may be the same as defined in 3GPP Rel-17. The UE determines quality metrics for each subcarrier. The quality metrics may be, for example, RSRP or RSRQ. Based on the quality metrics and the determining method, the UE determines which subcarriers $\{f_i\}$s to use for the carrier phase determination.

At 306, the UE measures the carrier phase on the selected subcarriers. For each subcarrier $f_i$ the UE determines the carrier phase $\Phi_i$ using Equation (12), described above with respect to 204 of FIG. 2.

At 308, the UE determines and reports the virtual phase. The UE determines the virtual carrier phase at $f_0$ using Equation (11), and the resulting value is then reported to the gNB/LMF using RRC signaling.

The performance of carrier phase positioning may be impacted by multiple factors. In multipath propagation conditions, each path is received with a separate carrier phase. In order to enable high accuracy carrier phase-based positioning, it may be necessary to single out the carrier phase of the first path (which is the only one that can be the LOS path). In 3GPP Rel-16/Rel-17 positioning, the LOS path can be identified as the first arrival path in the time domain. For carrier phase measurement, the first arrival path may be determined in the time domain as well. However, if multiple carrier frequencies are used, it may be difficult to determine the carrier phase corresponding to the first arrival path. To solve the issue, the carrier phase may be measured for the first arrival path, and UE may report the phase measurement for first arrival path to LMF.

The channel frequency response for the single carrier case may be expressed as Equation (13) below.

$$H(0) = a_{LOS}e^{-j2\pi f_0 \tau_{LOS}} + \sum_{i=1}^{M} a_i e^{-j2\pi k f_0 \tau_i} \quad (13)$$

If the $\alpha_{los} \gg \alpha_i$, H(0) may be expressed as Equation (14) below.

$$H(0) = a_{LOS}e^{-j2\pi f_0 \tau_{LOS}} \quad (14)$$

The carrier phase may then be measured for the LOS path as shown in Equation (15) or (16) below.

$$\theta_1 = \arccos\left(\frac{\psi_1 \lambda}{2\pi d_{Tx}}\right) \quad (15)$$

$$\varphi = \arcsin(h_{LOS}) \quad (16)$$

In Equation (16), $h_{Los}$ is the channel time response for the LOS path.

For carrier phase measurement with multipath mitigation, the carrier phase measurement method may be implemented with OFDM signals and the phase may be measured in the frequency domain and/or time domain.

For positioning with high accuracy, only the LOS path component may be taken into account for phase measurement, and the NLOS path components should be mitigated as much as possible. One solution is to configure the UE to measure the carrier phase (in time and/or frequency domain) corresponding to the first arrival path, the i-th arrival path (for i>1), and all the paths.

To obtain the phase measurement per path, the UE may perform in either the time domain or the frequency domain. In time domain, the baseband equivalent channel impulse response (CIR) may be expressed as Equation (17) below.

$$h(t) = a_{LOS}e^{-j2\pi f_c \tau_{LOS}}\delta(t - \tau_{LOS}) + \sum_{i=1}^{M} a_i e^{-j2\pi f_c \tau_i}\delta(t - \tau_i) \quad (17)$$

In Equation (17), $\alpha_{Los}$ is the overall attenuation on the path corresponding to the LOS, $\alpha_i$ is the overall attenuation on the i-th path, $\tau_{LOS}$ is the propagation delay for the LOS path, and $\tau_i$ is the propagation delay for i-th path.

The phase measurement $\varphi$ corresponding to the first arrival path may be obtained by Equation (18) below.

$$\varphi = \angle\left(a_{LOS}e^{-j2\pi f_c \tau_{LOS}}\right)$$

In Equation (18), $\angle(\cdot)$ is the angle measurement operation.

In the frequency domain, the CIR for the k-th subcarrier may be represented as Equation (19) below.

$$H(k) = a_{LOS}e^{-j2\pi(f_0 + k \cdot \Delta f)\tau_{LOS}} + \sum_{i=1}^{M} a_i e^{-j2\pi k(f_0 + k \cdot \Delta f)\tau_i} \quad (19)$$

In Equation (19), $\alpha_{Los}$ is the overall attenuation on the path corresponding to the LOS, $\alpha_i$ is the overall attenuation on the i-th path, $\tau_{LOS}$ is the propagation delay for the LOS path, $\tau_i$ is the propagation delay for i-th path, $f_0$ is the baseband signal center frequency, and $\Delta f$ is the subcarrier spacing.

Figure 4:
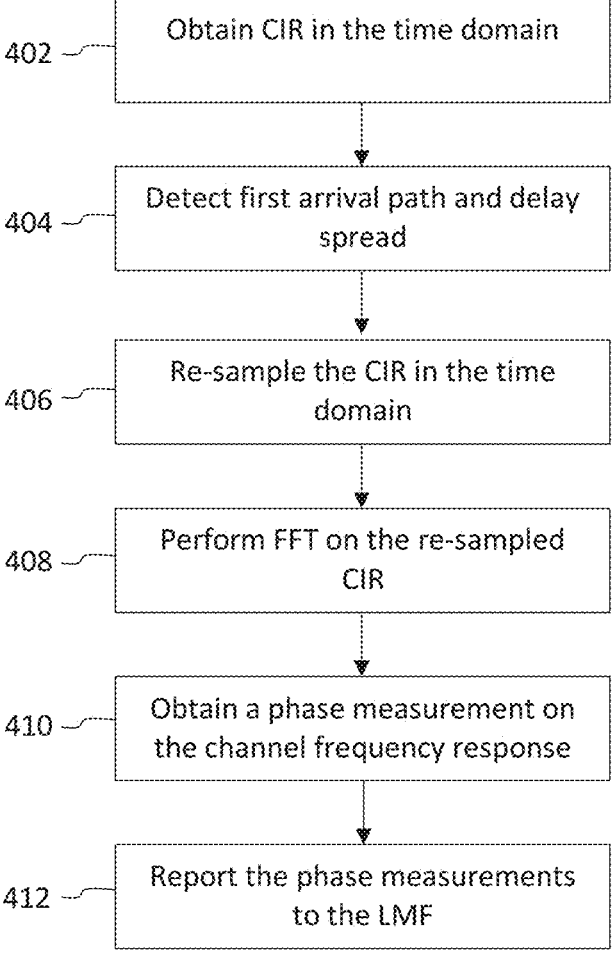
FIG. 4 is a flowchart illustrating a method for carrier phase positioning, according to an embodiment.

FIG. 4 is a flowchart illustrating a method for obtaining the phase measurement corresponding to the first arrival path in the frequency domain, according to an embodiment. It may be assumed that the bandwidth of PRS is W Hz.

At 402, the UE obtains the CIR in the time domain with a sampling interval between two adjacent points of 1/W seconds. At 404, the UE detects the first arrival path (FAP) and delay spread $\tau$ based on the CIR. At 406, the UE re-samples the CIR in the time domain starting from the FAP sample the CIR in time domain with sample interval k/W such that.

$$\frac{k-1}{W} < \tau \le \frac{k}{W} \qquad (20)$$

At 408, the UE performs fast Fourier transform (FFT) on the re-sampled CIR to form the channel frequency response H(k). The channel frequency response H(k) only includes the components from first arrival path.

At 410, the UE obtains a phase measurement $\varphi_k$ on the channel frequency response H(k) as shown in Equation (21) below.

$$\varphi_k = \angle(H(k)) \qquad (21)$$

At 412, the UE reports the phase measurements $\varphi_k$ on k-th subcarrier to the LMF. The UE may also be configured to report a function of $\varphi_k$ (i.e., the virtual phase measurement) associated with a function of subcarrier frequencies $f_k$ (i.e., the virtual frequency) to LMF.

The UE may indicate by capability whether or not it supports reporting carrier-phase measurements for a first path. The LMF may indicate in its request whether to measure for the first path only or for the whole received signal. The UE may indicate in its measurement whether or not the carrier phase is measured for the first path only.

Figure 5:
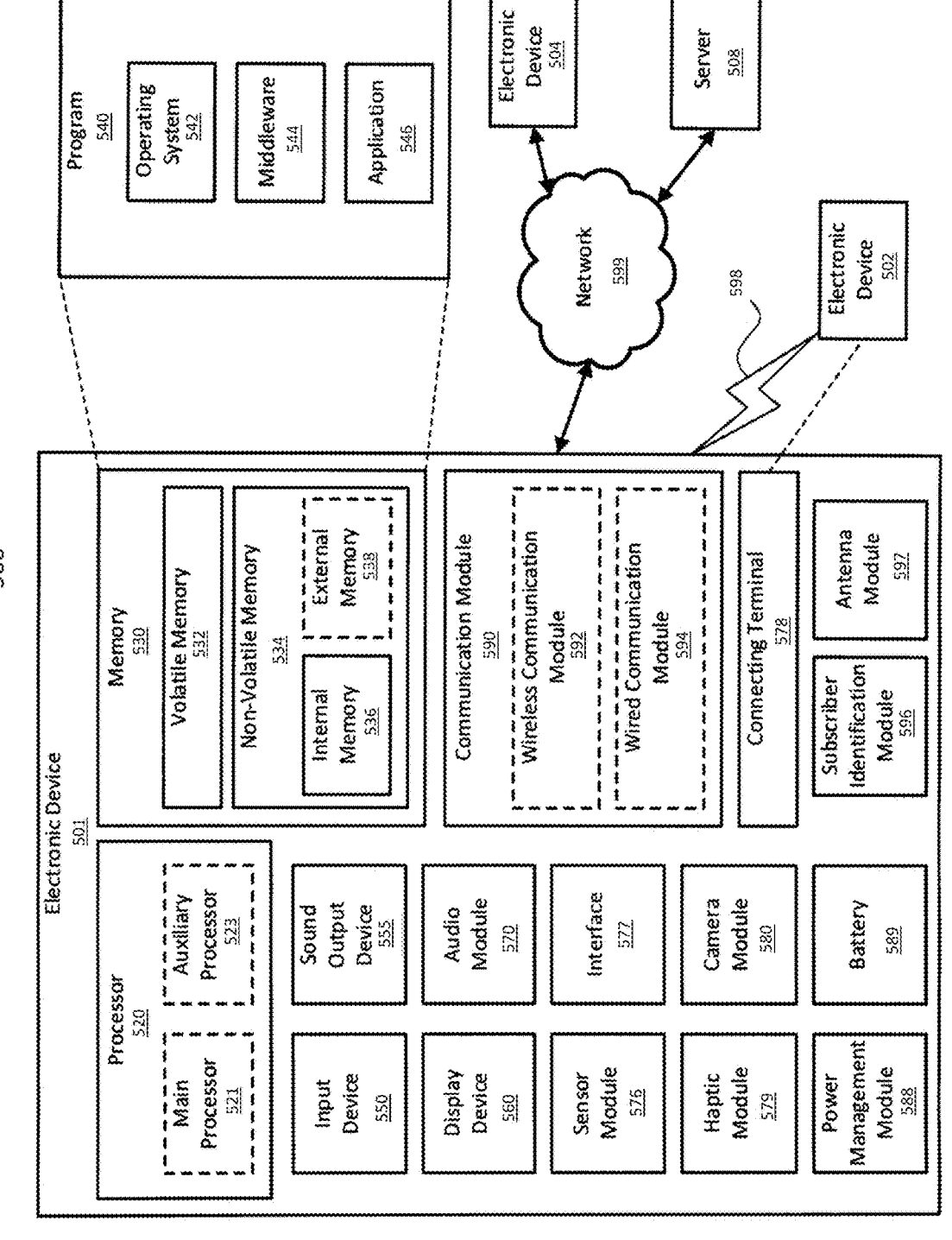
FIG. 5 is a block diagram of an electronic device in a network environment, according to an embodiment.

Referring to FIG. 5, an electronic device 501 in a network environment 500 may communicate with an electronic device 502 via a first network 598 (e.g., a short-range wireless communication network), or an electronic device 504 or a server 508 via a second network 599 (e.g., a long-range wireless communication network). The electronic device 501 may communicate with the electronic device 504 via the server 508. The electronic device 501 may be embodied as the transmitting or receiving UE described above, and is in communication with the electronic device 504 or the server 508, which may be embodied as the gNB or corresponding UE.

The electronic device 501 may include a processor 520, a memory 530, an input device 540, a sound output device 555, a display device 560, an audio module 570, a sensor module 576, an interface 577, a haptic module 579, a camera module 580, a power management module 588, a battery 589, a communication module 590, a subscriber identification module (SIM) card 596, or an antenna module 594. In one embodiment, at least one (e.g., the display device 560 or the camera module 580) of the components may be omitted from the electronic device 501, or one or more other components may be added to the electronic device 501. Some of the components may be implemented as a single integrated circuit (IC). For example, the sensor module 576 (e.g., a fingerprint sensor, an iris sensor, or an illuminance sensor) may be embedded in the display device 560 (e.g., a display).

The processor 520 may execute software (e.g., a program 540) to control at least one other component (e.g., a hardware or a software component) of the electronic device 501 coupled with the processor 520 and may perform various data processing or computations.

As at least part of the data processing or computations, the processor 520 may load a command or data received from another component (e.g., the sensor module 546 or the communication module 590) in volatile memory 532, process the command or the data stored in the volatile memory 532, and store resulting data in non-volatile memory 534.

The processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or execute a particular function. The auxiliary processor 523 may be implemented as being separate from, or a part of, the main processor 521.

The auxiliary processor 523 may control at least some of the functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). The auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, or a keyboard.

The sound output device 555 may output sound signals to the outside of the electronic device 501. The sound output device 555 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. The display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. The audio module 570 may obtain the sound via the input device 550 or output the sound via the sound output device 555 or a headphone of an external electronic device 502 directly (e.g., wired) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. The sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device 502 directly (e.g., wired) or wirelessly. The interface 577 may include, for example, a high-definition multimedia interface (HDMI), a universal serial bus (USB) interface, a secure digital (SD) card interface, or an audio interface.

A connecting terminal 578 may include a connector via which the electronic device 501 may be physically connected with the external electronic device 502. The connecting terminal 578 may include, for example, an HDMI connector, a USB connector, an SD card connector, or an audio connector (e.g., a headphone connector).

The haptic module 579 may convert an electrical signal into a mechanical stimulus (e.g., a vibration or a movement) or an electrical stimulus which may be recognized by a user via tactile sensation or kinesthetic sensation. The haptic module 579 may include, for example, a motor, a piezoelectric element, or an electrical stimulator.

The camera module 580 may capture a still image or moving images. The camera module 580 may include one or more lenses, image sensors, image signal processors, or flashes. The power management module 588 may manage power supplied to the electronic device 501. The power management module 588 may be implemented as at least part of, for example, a power management integrated circuit (PMIC).

The battery 589 may supply power to at least one component of the electronic device 501. The battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the AP) and supports a direct (e.g., wired) communication or a wireless communication. The communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or a standard of the Infrared Data Association (IrDA)) or the second network 599 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. The antenna module 597 may include one or more antennas, and, therefrom, at least one antenna appropriate for a communication scheme used in the communication network, such as the first network 598 or the second network 599, may be selected, for example, by the communication module 590 (e.g., the wireless communication module 592). The signal or the power may then be transmitted or received between the communication module 590 and the external electronic device via the selected at least one antenna.

Commands or data may be transmitted or received between the electronic device 501 and the external electronic device 504 via the server 508 coupled with the second network 599. Each of the electronic devices 502 and 504 may be a device of a same type as, or a different type, from the electronic device 501. All or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
obtaining, by a user equipment (UE), a set of coefficients and a set of subcarriers from a location management function (LMF);
measuring, by a user equipment (UE), carrier phases on subcarriers, from the set of subcarriers, of a received reference signal transmitted with multi-carrier modulation;
determining, by the UE, a virtual carrier phase generated from the measured carrier phases and corresponding coefficients, from the set of coefficients; and
reporting, by the UE, the virtual carrier phase to the LMF.
2. The method of claim 1, further comprising transmitting, by the UE via the higher layer signaling, capability information indicating a UE capability for reporting the virtual carrier phase.

3. The method of claim 1, further comprising receiving, by the UE via the higher layer signaling, measurement configuration parameters.
4. The method of claim 3, wherein the measurement configuration parameters indicate at least one of a carrier phase measurement method, carrier frequencies and coefficients, parameters to select the subcarriers, and whether the UE supports carrier phase measurements for a first arrival path.
5. The method of claim 1, further comprising selecting the subcarriers from the reference signal based on signal quality.
6. The method of claim 5, wherein the subcarriers have a signal quality higher than a signal quality threshold or within a top percentage of reference signal subcarriers.
7. The method of claim 6, wherein the signal quality threshold is a reference signal received power value or a reference signal received quality value.
8. The method of claim 1, further comprising determining an initial position of the UE using a positioning technique.
9. The method of claim 1, wherein the higher layer signaling is radio resource control (RRC) signaling.
10. The method of claim 1, further comprising:
detecting, by the UE, a first arrival path based on channel impulse response;
determining, by the UE, a carrier phase of the first arrival path; and
reporting the carrier phase of the first arrival path.
11. A user equipment (UE) comprising:
a processor; and
a non-transitory computer readable storage medium storing instructions that, when executed, cause the processor to:
obtain a set of coefficients and a set of subcarriers from a location management function (LMF);
measure carrier phases on subcarriers, from the set of subcarriers, of a received reference signal transmitted with multi-carrier modulation;
determine a virtual carrier phase generated from the measured carrier phases and corresponding coefficients, from the set of coefficients; and
report the virtual carrier phase to the LMF.
12. The UE of claim 11, wherein the instructions further cause the processor to transmit, via the higher layer signaling, capability information indicating a UE capability for reporting the virtual carrier phase.
13. The UE of claim 11, wherein the instructions further cause the processor to receive measurement configuration parameters via the higher layer signaling.
14. The UE of claim 13, wherein the measurement configuration parameters indicate at least one of a carrier phase measurement method, carrier frequencies and coefficients, parameters to select the subcarriers, and whether the UE supports carrier phase measurements for a first arrival path.
15. The UE of claim 11, wherein the instructions further cause the processor to select the subcarriers from the reference signal based on signal quality.
16. The UE of claim 15, wherein the subcarriers have a signal quality higher than a signal quality threshold or within a top percentage of reference signal subcarriers.
17. The UE of claim 16, wherein the signal quality threshold is a reference signal received power value or a reference signal received quality value.
18. The UE of claim 11, wherein the instructions further cause the processor to determine an initial position of the UE using a positioning technique.
19. The UE of claim 11, wherein the instructions further cause the processor to:

detect a first arrival path based on channel impulse response;

determine a carrier phase of the first arrival path; and report the carrier phase of the first arrival path.

20. A system comprising:

a user equipment (UE) configured to obtain a set of coefficients and a set of subcarriers, measure carrier phases on subcarriers, from the set of subcarriers, of a received reference signal transmitted with multi-carrier modulation, determine a virtual carrier phase generated from the measured carrier phases and corresponding coefficients, from the set of coefficients, and report the virtual carrier phase; and a location management function configured to transmit the set of coefficients and the set of subcarriers to the UE, and receive the virtual carrier phase from the UE.

\* \* \* \* \*